US009932504B2

(12) United States Patent
Kawabe et al.

(10) Patent No.: US 9,932,504 B2
(45) Date of Patent: Apr. 3, 2018

(54) AQUEOUS EMULSION COMPOSITION

(71) Applicant: DAIKIN INDUSTRIES, LTD., Osaka-shi, Osaka (JP)

(72) Inventors: Rumi Kawabe, Settsu (JP); Ryousuke Hara, Settsu (JP); Masahiro Miyahara, Settsu (JP); Masaki Fukumori, Settsu (JP); Kouji Kubota, Settsu (JP); Kensuke Mohara, Settsu (JP); Takashi Enomoto, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/387,047

(22) PCT Filed: Mar. 19, 2013

(86) PCT No.: PCT/JP2013/057859
§ 371 (c)(1),
(2) Date: Sep. 22, 2014

(87) PCT Pub. No.: WO2013/141249
PCT Pub. Date: Sep. 26, 2013

(65) Prior Publication Data

US 2015/0080510 A1 Mar. 19, 2015

(30) Foreign Application Priority Data

Mar. 23, 2012 (JP) ................................ 2012-067081

(51) Int. Cl.

| | |
|---|---|
| ***D06M 15/277*** | (2006.01) |
| ***D06M 13/325*** | (2006.01) |
| ***D06M 13/402*** | (2006.01) |
| ***D06M 15/53*** | (2006.01) |
| ***B01F 17/00*** | (2006.01) |
| ***C08K 5/20*** | (2006.01) |
| ***C08K 5/06*** | (2006.01) |
| ***C08K 5/101*** | (2006.01) |
| ***C08L 33/16*** | (2006.01) |
| ***C08L 71/02*** | (2006.01) |
| ***C09D 133/16*** | (2006.01) |
| ***C09D 5/16*** | (2006.01) |
| ***C09K 3/18*** | (2006.01) |
| ***C08G 65/26*** | (2006.01) |

(52) U.S. Cl.
CPC ........... *C09K 3/18* (2013.01); *B01F 17/0028* (2013.01); *B01F 17/0035* (2013.01); *B01F 17/0042* (2013.01); *B01F 17/0085* (2013.01); *C08G 65/2609* (2013.01); *C08K 5/06* (2013.01); *C08K 5/20* (2013.01); *C08L 33/16* (2013.01); *C08L 71/02* (2013.01); *C09D 5/16* (2013.01); *C09D 133/16* (2013.01); *D06M 13/325* (2013.01); *D06M 13/402* (2013.01); *D06M 15/277* (2013.01); *D06M 15/53* (2013.01); *C08K 5/101* (2013.01); *C08L 2201/54* (2013.01); *D06M 2200/01* (2013.01); *D06M 2200/11* (2013.01); *D06M 2200/12* (2013.01)

(58) Field of Classification Search
CPC ............ D06M 15/277; D06M 15/285; D06M 15/256; D06M 2200/01; D06M 2200/11; D06M 2200/12; D06M 13/325; D06M 13/402; D06M 15/53; B01F 17/0042; B01F 17/0085; B01F 17/0028; B01F 17/0035; C08K 5/20; C08K 5/06; C08K 5/101; C08L 33/16; C08L 71/02; C08L 27/12; C08L 2201/54; C09D 133/16; C09D 5/16; C09K 3/18; C08G 65/2609
USPC ........................................................ 524/217
See application file for complete search history.

(56) References Cited

U.S. PATENT DOCUMENTS

| | | | | |
|---|---|---|---|---|
| 5,965,656 | A | 10/1999 | Yamamoto et al. | |
| 7,015,275 | B1 * | 3/2006 | Aga et al. | 524/544 |
| 2003/0153664 | A1 | 8/2003 | Sugimoto et al. | |
| 2006/0148353 | A1 * | 7/2006 | Aga et al. | 442/128 |
| 2008/0027170 | A1 * | 1/2008 | Kubota | 524/612 |

FOREIGN PATENT DOCUMENTS

| | | | |
|---|---|---|---|
| EP | 1195420 | A1 | 4/2002 |
| EP | 1477543 | A1 | 11/2004 |
| JP | 06-271839 | A | 9/1994 |
| JP | 09-118877 | A | 5/1997 |
| JP | 09-125051 | A | 5/1997 |
| JP | 09-302335 | A | 11/1997 |
| JP | 11-255995 | A | 9/1999 |

(Continued)

OTHER PUBLICATIONS

International Preliminary Report on Patentability dated Oct. 2, 2014, issued by the International Bureau in corresponding International Application No. PCT/JCT2013/057859.

(Continued)

*Primary Examiner* — Angela C Scott
(74) *Attorney, Agent, or Firm* — Sughrue Mion, PLLC

(57) ABSTRACT

Provided is an aqueous emulsion composition which has excellent chemical stability (stability with respect to impurities) and excellent mechanical stability. Disclosed is an aqueous emulsion composition which contains: (A) a polymer that contains a fluoroalkyl group; and (B) a surfactant that contains (B1) an amidoamine surfactant having an amide group and an amino group, and (B2) a nonionic surfactant. It is preferable that the surfactant does not contain a monool having an unsaturated triple bond or an alkylene oxide addition product of a polyol.

14 Claims, No Drawings

(56) References Cited

FOREIGN PATENT DOCUMENTS

| | | |
|---|---|---|
| JP | 2000-017173 A | 1/2000 |
| JP | 2000-169735 A | 6/2000 |
| JP | 2004-026781 A | 1/2004 |

OTHER PUBLICATIONS

International Search Report for PCT/JP2013/057859, dated Jun. 18, 2013 (PCT ISA 210).
Communication dated Dec. 17, 2015 from the European Patent Office issued in corresponding Application No. 13764577.6.

* cited by examiner

AQUEOUS EMULSION COMPOSITION

CROSS REFERENCE TO RELATED APPLICATIONS

This application is a National Stage of International Application No. PCT/JP2013/057859, filed Mar. 19, 2013, claiming priority from Japanese Patent Application No. 2012-067081, filed Mar. 23, 2012, the contents of all of which are incorporated herein by reference in their entirety.

TECHNICAL FIELD

The present invention relates to an aqueous emulsion composition which is excellent in the stability against mechanical impact in the treatment bath and the stability in the presence of impurity in the treatment bath at the treatment with aqueous emulsion, which can maintain high water- and oil-repellency and its durability.

BACKGROUND ART

It is known that a polymer prepared from a polymerizable compound having a perfluoroalkyl or perfluoroalkenyl group and an acrylate or methacrylate group is useful as a water- and oil-repellent agent used for a textile and woven fabric. Particularly an aqueous dispersion wherein said polymer is dispersed in an aqueous medium with an emulsifier is industrially and widely used.

A water- and oil repellent agent treatment bath prepared by diluting conventional aqueous dispersions, however, often has the problems that a impurity attached to a processed fabric during a pretreatment step incorporates into the bath in a treatment step, and then the dispersibility of the aqueous dispersion is deteriorated, emulsion particles may agglomerate and precipitation may be caused, or the dispersion is broken because of a mechanical impact exerted when a treated fabric enters into the bath or leaves from the bath, emulsion particles may agglomerate and precipitation may be caused, so that the water- and oil-repellency performance is deteriorated and the polymer attaches to a roll to give a soiled fabric. That is, the conventional aqueous dispersions are insufficient in stability against impurity and mechanical stability during treatment step.

Methods having excellent stability against impurity are proposed in JP-A-9-118877, JP-A-9-125051, JP-A-9-302335, JP-A-9-118877, JP-A-9-125051 and JP-A-2000-169735, but do not always provide sufficiently satisfactory stability in connection with variety of recent water- and oil-repellent treatments.

PRIOR ARTS DOCUMENTS

Patent Documents

Patent Document 1: JP-A-9-118877

Patent Document 2: JP-A-9-125051

Patent Document 3: JP-A-9-302335

Patent Document 4: JP-A-9-118877

Patent Document 5: JP-A-9-125051

Patent Document 6: JP-A-2000-169735

DISCLOSURE OF INVENTION

Problems to be Solved by the Invention

An object of the present invention is to provide an aqueous emulsion composition excellent in chemical stability (impurity stability) and mechanical stability.

Means for Solving the Problems

The present invention provides an aqueous emulsion composition comprising:

(A) a polymer having a fluoroalkyl group, and (B) a surfactant comprising an amidoamine surfactant having an amide group and an amino group.

Particularly, the present invention provides an aqueous emulsion composition comprising:

(A) a polymer having a fluoroalkyl group, and (B) a surfactant comprising:

(B1) an amidoamine surfactant having an amide group and an amino group, and (B2) a nonionic surfactant.

Effects of the Invention

The aqueous emulsion composition of the present invention is excellent in the stability against mechanical impact in the treatment bath and the stability in the presence of impurity (such as a dye adhesive agent) in the treatment bath at the treatment with aqueous emulsion, and can maintain high water- and oil-repellency and high durability of the repellency. In the aqueous emulsion composition, particles do not sediment, and the polymer does not adhere to a roll to give a soiled fabric.

The aqueous emulsion composition of the present invention can be used as a surface treatment agent, for example, a water- and oil-repellent agent, and a soil-resistant agent.

The surface treatment agent of the present invention gives excellent water- and oil-repellency, antifouling property, and durability thereof.

MODES FOR CARRYING OUT THE INVENTION

The aqueous emulsion composition is an aqueous emulsion of a fluorine-containing polymer.

The aqueous emulsion composition comprises:

(A) a polymer having a fluoroalkyl group, (B) a surfactant comprising an amidoamine surfactant having an amide group and an amino group, and (C) an aqueous medium.

The fluorine-containing polymer is a homopolymer having repeating units derived from a fluorine-containing monomer, a copolymer having repeating units derived from at least two fluorine-containing monomers, or a copolymer having repeating units derived from a fluorine-containing monomer and repeating units derived from another polymerizable compound copolymerizable with the fluorine-containing monomer.

Preferably, in the present invention, the fluorine-containing polymer (A) comprises:

(A1) repeating units derived from the fluorine-containing monomer, (A2) optionally present, repeating units derived from the fluorine-free non-crosslinkable monomer, and (A3) optionally present, repeating units derived from the fluorine-free crosslinkable monomer.

(A1) Fluorine-Containing Monomer

Generally, the fluorine-containing monomer is a polymerizable compound having a perfluoroalkyl or perfluoroalkenyl group and an acrylate, methacrylate or alpha-substituted acrylate group.

The fluorine-containing monomer may be a compound of the formula:

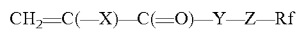

wherein X is a hydrogen atom, a monovalent organic group or a halogen atom,

Y is —O— or —NH—,

Z is a direct bond or a divalent organic group, and

Rf is a fluoroalkyl group having 1 to 20 carbon atoms.

Z may be for example a linear or branched aliphatic group (particularly an alkylene group) having 1 to 20 carbon atoms, for example, a group of the formula —$(CH_2)_x$— where x is 1 to 10, a group of the formula —$R^2(R^1)$N—$SO_2$— or of the formula —$R^2(R^1)$N—CO—, where $R^1$ is an alkyl group having 1 to 10 carbon atoms and $R^2$ is a linear or branched alkylene group having 1 to 10 carbon atoms, or a group of the formula —$CH_2CH(OR^3)CH_2$—$(Ar—O)_p$— where $R^3$ represents a hydrogen atom or an acyl group having 1 to 10 carbon atoms such as formyl or acetyl, Ar is an arylene group optionally having a substituent, p is 0 or 1, a group of the formula —$CH_2$—Ar—$(O)_q$— where Ar is an arylene group optionally having a substituent, q is 0 or 1, or a —$(CH_2)_m$—$SO_2$—$(CH_2)_n$— group, or a —$(CH_2)_m$—S—$(CH_2)_n$— group wherein m is from 1 to 10 and n is from 0 to 10.

The fluorine-containing monomer (Al) is preferably an acrylate ester of the formula:

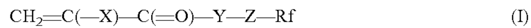

wherein X is a hydrogen atom, a linear or branched alkyl group having 1 to 21 carbon atoms, a fluorine atom, a chlorine atom, a bromine atom, a iodine atom, a $CFX^1X^2$ group (wherein $X^1$ and $X^2$ is a hydrogen atom a fluorine atom, a chlorine atom, a bromine atom or a iodine atom), a cyano group, a linear or branched fluoroalkyl group having 1 to 21 carbon atoms, a substituted or unsubstituted benzyl group, or a substituted or unsubstituted phenyl group;

Y is —O— or —NH—;

Z is an aliphatic group having 1 to 10 carbon atoms, an aromatic or cycloaliphatic group having 6 to 18 carbon atoms, a —$CH_2CH_2N(R^1)SO_2$— group wherein $R^1$ is an alkyl group having 1 to 4 carbon atoms, a —$CH_2CH(OZ^1)CH_2$-$(Ph-O)_p$— group wherein $Z^1$ is a hydrogen atom or an acetyl group, Ph is a phenylene group and p is 0 or 1, a —$(CH_2)_p$-Ph-O— group wherein Ph is a phenylene group and n is 0 to 10, a —$(CH_2)_m$—$SO_2$—$(CH_2)_n$— group, or a —$(CH_2)_m$—S—$(CH_2)_n$— group wherein m is from 1 to 10 and n is from 0 to 10; and

Rf is a linear or branched fluoroalkyl group having 1 to 20 carbon atoms.

In the fluorine-containing monomer, the Rf group is preferably a perfluoroalkyl group. The carbon number of the Rf group is from 1 to 12, for example, from 1 to 6, especially from 4 to 6. Examples of the Rf group include —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_2CF_3$, —$(CF_2)_5CF_3$, —$(CF_2)_3CF(CF_3)_2$, and $C_8F_{17}$.

Z is preferably an aliphatic group having 1 to 10 carbon atoms, an aromatic group or cycloaliphatic group having 6 to 18 carbon atoms, a —$CH_2CH_2N(R^1)SO_2$— group wherein $R^1$ is an alkyl group having 1 to 4 carbon atoms, a —$CH_2CH(OZ^1)CH_2$-$(Ph-O)_p$— group wherein $Z^1$ is a hydrogen atom or an acetyl group, Ph is a phenylene group and p is 0 or 1, a —$(CH_2)_n$-Ph-O— group wherein Ph is a phenylene group and n is 0 to 10, a —$(CH_2)_m$—$SO_2$—$(CH_2)_n$— group, or a —$(CH_2)_m$—S—$(CH_2)_n$— group wherein m is from 1 to 10 and n is from 0 to 10. The aliphatic group is preferably an alkylene group (particularly the carbon number is from 1 to 4, for example, 1 or 2.). The aromatic group and cycloaliphatic group may be substituted or unsubstituted. The S or $SO_2$— group may be directly bonded to the Rf group.

The non-limiting examples of the fluorine-containing monomer (a) are as follows:

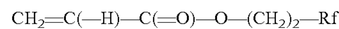

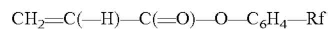

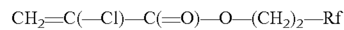

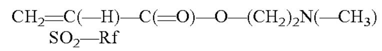

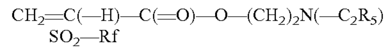

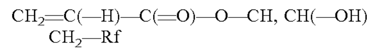

$CH_2$═C(—H)—C(═O)—O—$CH_2$CH(—$OCOCH_3$)$CH_2$—Rf $CH_2$═C(—H)—C(═O)—O—$(CH_2)_2$—S—Rf

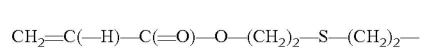

$CH_2$═C(—H)—C(═O)—O—$(CH_2)_3$—$SO_2$—Rf

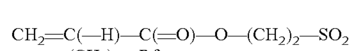

$CH_2$═C(—H)—C(═O)—NH—$(CH_2)_2$—Rf

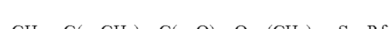

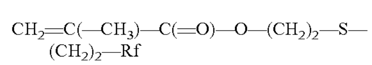

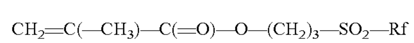

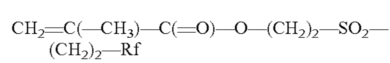

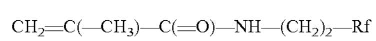

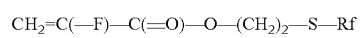

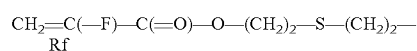

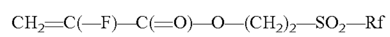

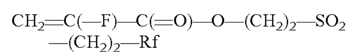

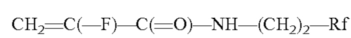

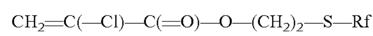

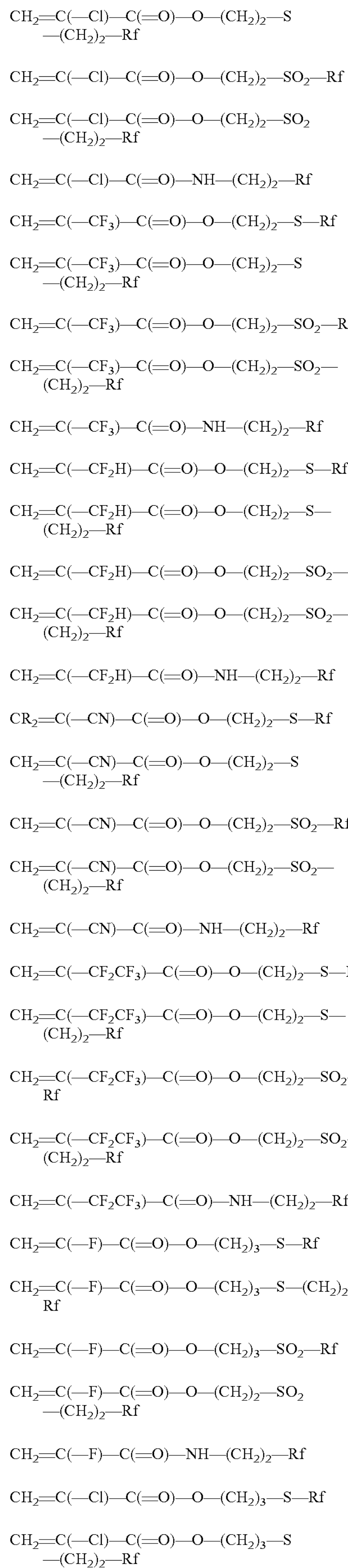

$CH_2$=C(—Cl)—C(=O)—O—$(CH_2)_2$—S—$(CH_2)_2$—Rf $CH_2$=C(—Cl)—C(=O)—O—$(CH_2)_2$—$SO_2$—Rf $CH_2$=C(—Cl)—C(=O)—O—$(CH_2)_2$—$SO_2$—$(CH_2)_2$—Rf $CH_2$=C(—Cl)—C(=O)—NH—$(CH_2)_2$—Rf $CH_2$=C(—$CF_3$)—C(=O)—O—$(CH_2)_2$—S—Rf $CH_2$=C(—$CF_3$)—C(=O)—O—$(CH_2)_2$—S—$(CH_2)_2$—Rf $CH_2$=C(—$CF_3$)—C(=O)—O—$(CH_2)_2$—$SO_2$—Rf $CH_2$=C(—$CF_3$)—C(=O)—O—$(CH_2)_2$—$SO_2$—$(CH_2)_2$—Rf $CH_2$=C(—$CF_3$)—C(=O)—NH—$(CH_2)_2$—Rf $CH_2$=C(—$CF_2H$)—C(=O)—O—$(CH_2)_2$—S—Rf $CH_2$=C(—$CF_2H$)—C(=O)—O—$(CH_2)_2$—S—$(CH_2)_2$—Rf $CH_2$=C(—$CF_2H$)—C(=O)—O—$(CH_2)_2$—$SO_2$—Rf $CH_2$=C(—$CF_2H$)—C(=O)—O—$(CH_2)_2$—$SO_2$—$(CH_2)_2$—Rf $CH_2$=C(—$CF_2H$)—C(=O)—NH—$(CH_2)_2$—Rf $CR_2$=C(—CN)—C(=O)—O—$(CH_2)_2$—S—Rf $CH_2$=C(—CN)—C(=O)—O—$(CH_2)_2$—S—$(CH_2)_2$—Rf $CH_2$=C(—CN)—C(=O)—O—$(CH_2)_2$—$SO_2$—Rf $CH_2$=C(—CN)—C(=O)—O—$(CH_2)_2$—$SO_2$—$(CH_2)_2$—Rf $CH_2$=C(—CN)—C(=O)—NH—$(CH_2)_2$—Rf $CH_2$=C(—$CF_2CF_3$)—C(=O)—O—$(CH_2)_2$—S—Rf $CH_2$=C(—$CF_2CF_3$)—C(=O)—O—$(CH_2)_2$—S—$(CH_2)_2$—Rf $CH_2$=C(—$CF_2CF_3$)—C(=O)—O—$(CH_2)_2$—$SO_2$—Rf $CH_2$=C(—$CF_2CF_3$)—C(=O)—O—$(CH_2)_2$—$SO_2$—$(CH_2)_2$—Rf $CH_2$=C(—$CF_2CF_3$)—C(=O)—NH—$(CH_2)_2$—Rf $CH_2$=C(—F)—C(=O)—O—$(CH_2)_3$—S—Rf $CH_2$=C(—F)—C(=O)—O—$(CH_2)_3$—S—$(CH_2)_2$—Rf $CH_2$=C(—F)—C(=O)—O—$(CH_2)_3$—$SO_2$—Rf $CH_2$=C(—F)—C(=O)—O—$(CH_2)_2$—$SO_2$—$(CH_2)_2$—Rf $CH_2$=C(—F)—C(=O)—NH—$(CH_2)_2$—Rf $CH_2$=C(—Cl)—C(=O)—O—$(CH_2)_3$—S—Rf $CH_2$=C(—Cl)—C(=O)—O—$(CH_2)_3$—S—$(CH_2)_2$—Rf

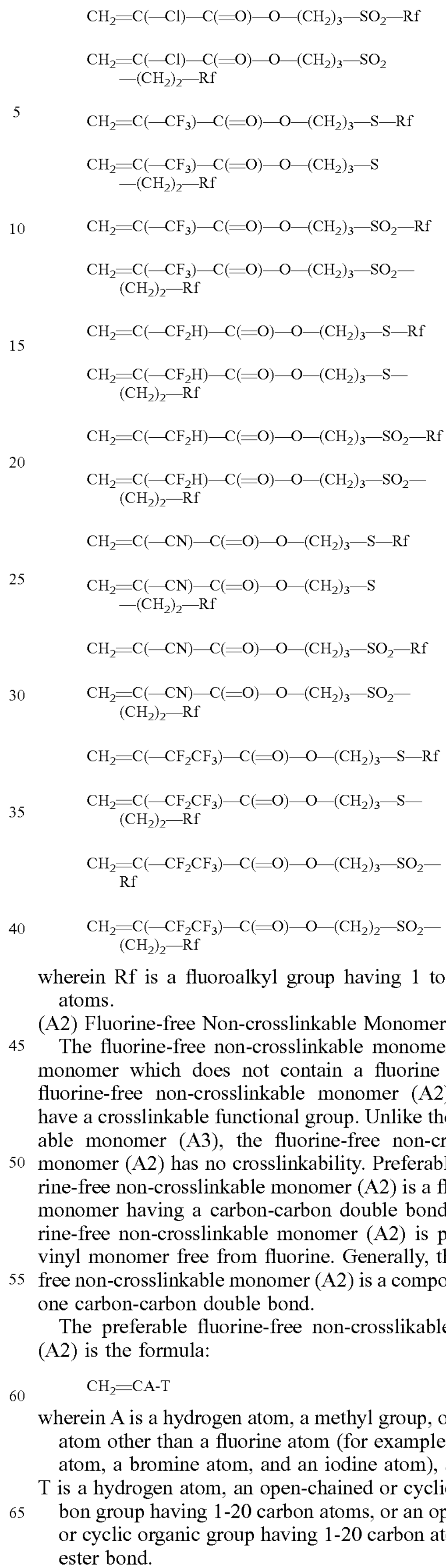

$CH_2$=C(—Cl)—C(=O)—O—$(CH_2)_3$—$SO_2$—Rf $CH_2$=C(—Cl)—C(=O)—O—$(CH_2)_3$—$SO_2$—$(CH_2)_2$—Rf $CH_2$=C(—$CF_3$)—C(=O)—O—$(CH_2)_3$—S—Rf $CH_2$=C(—$CF_3$)—C(=O)—O—$(CH_2)_3$—S—$(CH_2)_2$—Rf $CH_2$=C(—$CF_3$)—C(=O)—O—$(CH_2)_3$—$SO_2$—Rf $CH_2$=C(—$CF_3$)—C(=O)—O—$(CH_2)_3$—$SO_2$—$(CH_2)_2$—Rf $CH_2$=C(—$CF_2H$)—C(=O)—O—$(CH_2)_3$—S—Rf $CH_2$=C(—$CF_2H$)—C(=O)—O—$(CH_2)_3$—S—$(CH_2)_2$—Rf $CH_2$=C(—$CF_2H$)—C(=O)—O—$(CH_2)_3$—$SO_2$—Rf $CH_2$=C(—$CF_2H$)—C(=O)—O—$(CH_2)_3$—$SO_2$—$(CH_2)_2$—Rf $CH_2$=C(—CN)—C(=O)—O—$(CH_2)_3$—S—Rf $CH_2$=C(—CN)—C(=O)—O—$(CH_2)_3$—S—$(CH_2)_2$—Rf $CH_2$=C(—CN)—C(=O)—O—$(CH_2)_3$—$SO_2$—Rf $CH_2$=C(—CN)—C(=O)—O—$(CH_2)_3$—$SO_2$—$(CH_2)_2$—Rf $CH_2$=C(—$CF_2CF_3$)—C(=O)—O—$(CH_2)_3$—S—Rf $CH_2$=C(—$CF_2CF_3$)—C(=O)—O—$(CH_2)_3$—S—$(CH_2)_2$—Rf $CH_2$=C(—$CF_2CF_3$)—C(=O)—O—$(CH_2)_3$—$SO_2$—Rf $CH_2$=C(—$CF_2CF_3$)—C(=O)—O—$(CH_2)_2$—$SO_2$—$(CH_2)_2$—Rf wherein Rf is a fluoroalkyl group having 1 to 20 carbon atoms.

(A2) Fluorine-free Non-crosslinkable Monomer

The fluorine-free non-crosslinkable monomer (A2) is a monomer which does not contain a fluorine atom. The fluorine-free non-crosslinkable monomer (A2) does not have a crosslinkable functional group. Unlike the crosslinkable monomer (A3), the fluorine-free non-crosslinkable monomer (A2) has no crosslinkability. Preferably, the fluorine-free non-crosslinkable monomer (A2) is a fluorine-free monomer having a carbon-carbon double bond. The fluorine-free non-crosslinkable monomer (A2) is preferably a vinyl monomer free from fluorine. Generally, the fluorine-free non-crosslinkable monomer (A2) is a compound having one carbon-carbon double bond.

The preferable fluorine-free non-crosslikable monomer (A2) is the formula:

$CH_2$=CA-T wherein A is a hydrogen atom, a methyl group, or a halogen atom other than a fluorine atom (for example, a chlorine atom, a bromine atom, and an iodine atom), and T is a hydrogen atom, an open-chained or cyclic hydrocarbon group having 1-20 carbon atoms, or an open-chained or cyclic organic group having 1-20 carbon atoms and an ester bond.

Examples of the open-chain or cyclic hydrocarbon group having 1-20 carbon atoms are a linear or branched aliphatic hydrocarbon group having 1-20 carbon atoms, a cyclic aliphatic group having 4-20 carbon atoms, an aromatic hydrocarbon group having 6-20 carbon atoms, and an araliphatic hydrocarbon group having 7-20 carbon atoms.

Examples of the open-chain or cyclic organic group having 1-20 carbon atoms and an ester bond are: —C(═O)—O-Q and —O—C(═O)-Q wherein Q is a linear or branched aliphatic hydrocarbon group having 1-20 carbon atoms, a cyclic aliphatic group having 4-20 carbon atoms, an aromatic hydrocarbon group having 6-20 carbon atoms, or an araliphatic hydrocarbon group having 7-20 carbon atoms.

Preferable examples of the fluorine-free non-crosslinkable monomer (A2) are, for example, ethylene, vinyl acetate, acrylonitrile, styrene, a poly(ethyleneglycol)(meth)acrylate, polypropyleneglycol(meth)acrylate, methoxypolyethyleneglycol(meth)acrylate, methoxypolypropyleneglycol (meth)acrylate, and vinyl alkyl ether. The fluorine-free non-crosslinkable monomer (A2) is not limited to these examples.

The fluorine-free non-crosslinkable monomer (A2) may be (meth)acrylate ester having an alkyl group. The number of the carbon atoms in the alkyl group may be from 1 to 30, for example, from 6 to 30 (e.g., from 10 to 30). For example, the fluorine-free non-crosslinkable monomer (A2) may be acrylates of the general formula:

$$CH_2{=}CA^1COOA^2$$

wherein $A^1$ is a hydrogen atom, a methyl group, or a halogen atom other than a fluorine atom (for example, a chlorine atom, a bromine atom, and an iodine atom), and $A^2$ is an alkyl group represented by $C_nH_{2n+1}$ (n=1-30).

The fluorine-free non-crosslinkable monomer (A2) may be (meth)acrylate may be a (meth)acrylate monomer having a cyclic hydrocarbon group. The (meth)acrylate monomer having a cyclic hydrocarbon group is a compound having (preferably monovalent) cyclic hydrocarbon group and monovalent (meth)acrylate group. The monovalent cyclic hydrocarbon group directly bonds to the monovalent (meth) acrylate group. Examples of the cyclic hydrocarbon group include a saturated or unsaturated, monocyclic group, polycyclic group or bridged ring group. The cyclic hydrocarbon group is preferably a saturated group. The cyclic hydrocarbon group preferably has from 4 to 20 carbon atoms. Examples of the cyclic hydrocarbon group include a cycloaliphatic group having 4 to 20 carbon atoms, particularly 5 to 12 carbon atoms, an aromatic group having 6 to 20 carbon atoms, and an araliphatic group having 7 to 20 carbon atoms. The number of carbon atoms in the cyclic hydrocarbon group is particularly preferably at most 15, for example, at most 10. A carbon atom in the cyclic hydrocarbon group preferably directly bonds to an ester group in the (meth) acrylate group. The cyclic hydrocarbon group is preferably a saturated cycloaliphatic group. Specific examples of the cyclic hydrocarbon group include a cyclohexyl group, a t-butyl cyclohexyl group, an isobornyl group, a dicyclopentanyl group and a dicyclopentenyl group. The (meth)acrylate group is an acrylate group or a methacrylate group, preferably a methacrylate group. Specific examples of the monomer having cyclic hydrocarbon group include cyclohexyl methacrylate, t-butylcyclohexyl methacrylate, benzyl methacrylate, isobornyl methacrylate, isobornyl acrylate, dicyclopentanyl methacrylate, dicyclopentanyl acrylate, and dicyclopentenyl acrylate.

The fluorine-free non-crosslinkable monomer (A2) may be a halogenated olefin. The halogenated olefin monomer may be a halogenated olefin having 2-20 carbon atoms and substituted by 1-10 chlorine atoms, bromine atoms or iodine atoms. Preferably, the halogenated olefin is a chlorinated olefin having 2-20 carbon atoms, particularly an olefin having 2-5 carbon atoms and having 1-5 chlorine atoms. Preferable examples of the halogenated olefin are a vinyl halide such as vinyl chloride, vinyl bromide and vinyl iodide, and a vinylidene halide such as vinylidene chloride, vinylidene bromide and vinylidene iodide.

(A3) Fluorine-free Crosslinkable Monomer

The fluorine-containing polymer of the present invention may have repeating units derived from the fluorine-free crosslinkable monomer (A3). The fluorine-free crosslinkable monomer (A3) is a monomer which does not contain a fluorine atom. The fluorine-free crosslinkable monomer (A3) may be a compound free from fluorine, having at least two reactive groups and/or carbon-carbon double bonds. The fluorine-free crosslinkable monomer (A3) may be a compound which has at least two carbon-carbon double bonds or a compound which has at least one carbon-carbon double bond and at least one reactive group. Examples of the reactive group include a hydroxyl group, an epoxy group, a chloromethyl group, a blocked isocyanate group, an amino group and a carboxyl group.

Examples of the crosslinkable monomer (A3) include diacetoneacrylamide, (meth)acrylamide, N-methylolacrylamide, hydroxymethyl(meth)acrylate, hydroxyethyl(meth) acrylate, 3-chloro-2-hydroxypropyl(meth)acrylate, acetoacetoxyethyl(meth)acrylate, N,N-dimethylaminoethyl(meth) acrylate, N,N-diethylaminoethyl(meth)acrylate, butadiene, isoprene, chloroprene and glycidyl(meth)acrylate, to which the crosslinkable monomer is not limited.

When the fluorine-free non-crosslinkable monomer (A2) and/or the fluorine-free crosslinkable monomer (A3) are copolymerized, various properties such as water- and oil-repellency, stain-proofing properties, cleaning durability and washing durability of said properties, solubility in solvents, hardness and feeling may be improved depending on the necessity.

The monomer may be polymerized in the presence of at least one compound selected from the group consisting of a blocked isocyanate compound and an organopolysiloxane compound. The amount of the blocked isocyanate compound (or the organopolysiloxane compound) may be 0 to 100 parts by weight, for example, 1 to 50 parts by weight, based on 100 parts by weight of the monomer.

A fluorine-containing polymer having a blocked isocyanate group is obtained by polymerizing the monomer in the presence of the blocked isocyanate compound. The block isocyanate compound is isocyanate blocked by at least one blocking agent. Examples of the blocking agent include oximes, phenols, alcohols, mercaptans, amides, imides, imidazoles, ureas, amines, imines, pyrazoles, and active methylene compounds. Other examples of the blocking agent include pyridinols, thiophenols, diketones, and esters. The blocked isocyanate compound may be modified with compound(s) having a hydrophilic group.

A fluorine-containing polymer having a siloxane group is obtained by polymerizing the monomer in the presence of an organopolysiloxane compound (for example, mercapto-functional organopolysiloxane, vinyl-functional organopolysiloxane). In one embodiment, the mercapto-functional organopolysiloxane comprises siloxy units having the average formula:

$$(R_2SiO)_a(RR^NSiO)_b(RR^SSiO)_c$$

where; a is 0-4000, alternatively 0 to 1000, alternatively 0 to 400, b is 0-1000, alternatively 1 to 100, alternatively 1 to 50, c is 1-1000, alternatively 1 to 100, alternatively 1 to 50;

R is independently a monovalent organic group, alternatively R is a hydrocarbon containing 1-30 carbon atoms, alternatively R is a monovalent alkyl group containing 1-12 carbons, or alternatively R is a methyl group;

$R^N$ is a monovalent amino-functional organic group as defined above, $R^S$ each is a monovalent mercapto-functional organic group ($R^S$) as defined above.

In the fluorine-containing polymer, the amount of the fluorine-free non-crosslinkable monomer (A2) may be 1000 parts by weight or less, for example, 0.1 to 300 parts by weight, especially 1 to 200 parts by weight, the amount of the fluorine-free crosslinkable monomer (A3) may be 50 parts by weight or less, for example, 30 parts by weight or less, especially 0.1 to 20 parts by weight, based on 100 parts by weight of fluorine-containing monomer (A1).

Generally, a number-average molecular weight (Mn) of the fluorine-containing polymer may be from 1,000 to 1,000,000, for example, from 2,000 to 500,000, especially from 3,000 to 200,000. Generally, the number average molecular weight (Mn) of the fluorine-containing polymer is measured by GPC (Gel Permeation Chromatography).

The surfactant (B) comprises:

(B1) an amidoamine surfactant.

The surfactant (B) may contain, in addition to the amidoamine surfactant (B 1), another surfactants, for example, at least one surfactant selected from the group consisting of (B2) a nonionic surfactant and (B3) a cationic surfactant. The other surfactant includes, for example, an amine surfactant having an oxyalkylene group, an amine oxide surfactant, and an ampholytic surfactant. In the present invention, it is preferable not to use, as the surfactant, an alkylene oxide adduct (at least one compound) of a monool or polyol (having at least one OH group) having an unsaturated triple bond (described in JP-A-2000-169735).

(B1) Amidoamine Surfactant

The amidoamine surfactant is a compound having an amino group and an amide group. The amidoamine surfactant is preferably a compound of the formula:

$$R^1\text{—CONH—}(CH_2)_n\text{—}N(R^2)(R^3)$$

wherein $R^1$ is tan alkyl group or alkenyl group having 8-30 carbon atoms, $R^2$ and $R^3$ are an alkyl group having 1-6 carbon atoms, and n is 1 to 10.

Preferably, $R^1$ is the alkyl group or alkenyl group having 12-24 carbon atoms. Preferably, $R^2$ and $R^3$ are the alkyl groups having 1-4 carbon atoms. Preferably, n is 2 to 5.

Specific examples of amidoamine surfactant include diethylaminoethyl isostearamide, dimethylaminoethyl oleamide, dimethylaminopropyl oleamide, diethylaminoethyl oleamide, diethylaminopropyl oleamide, diethylaminoethyl stearamide, diethylaminopropyl stearamide, dibutylaminoethyl stearamide, dibutylaminopropyl stearamide, dipropylaminopropyl stearamide, dipropylaminoethyl stearamide, dimethylaminoethyl stearamide, dimethylaminopropyl stearamide, diethylaminoethyl palmitamide, diethylaminopropyl palmitamide, dimethylaminoethyl palmitamide, dimethylaminopropyl palmitamide, diethylaminoethyl behenamide, diethylaminopropyl behenamide, and dimethylaminopropyl behenamide.

The amidoamine surfactant may be a salt, for example, an acid salt or a quaternary ammonium salt. In the salt, a cation group is a nitrogen atom in an amino group, and an anion group may be various. Examples of the anion group include a halogen ion, a sulfate ion, a carboxylate ion having 1-4 carbon atoms which may be substituted with the hydroxyl group, and an alkyl sulfate ion having 1-4 carbon atoms.

The acid salt is obtained by neutralizing the amidoamine with an acid, for example, an inorganic acid and/or an organic acid. The inorganic acid includes hydrochloric acid, sulfuric acid and phosphoric acid. The organic acid includes short-chain monocarboxylic acids, such as acetic acid and propionic acid; long-chain monocarboxylic acids, such as lauric acid, myristic acid, palmitic acid, stearic acid, oleic acid, behenic acid and erucic acid; dicarboxylic acids, such as malonic acid, succinic acid , glutaric acid, adipic acid, maleic acid, fumaric acid and phthalic acid; hydroxycarboxylic acids, such as glycolic acid, lactic acid, hydroxy acrylic acid, glyceric acid, malic acid, tartaric acid and citric acid; polycarboxylic acids, such as polyglutamic acid; acidic amino acids, such as glutamic acid and aspartic acid; alkyl sulfates, alkyl sulfonates, and alkyl phosphate esters. Among them, the inomanic acids, the short-chain monocarboxylic acids, the dicarboxylic acids, the hydroxycarboxylic acids and the acidic amino acids are generally used. Particularly, hydrochloric acid, sulfuric acid, acetic acid, succinic acid, glycolic acid, lactic acid, malic acid, citric acid and glutamic acid are used.

The quaternary ammonium salt can be obtained by quaternizing the amidoamine.

The amidoamine surfactant may be nonionic or ionic (cationic), and is preferably nonionic. That is, in the present invention, it is preferable not to add an ionizing substance, such as an acid, so that the amidoamine surfactant is not ionic.

(B2) Nonionic Surfactant

The nonionic surfactant is a nonionic surfactant having an oxyalkylene group. Preferably, the number of carbon atoms of the alkylene group in an oxyalkylene group is from 2 to 10. Preferably, the number of the oxyalkylene groups in the molecule of a nonionic surfactant is from 2 to 100.

The nonionic surfactant may be, for example, an alkylene oxide adduct of linear or branched aliphatic (saturated and/or unsaturated) group, a polyalkylene glycol ester of a linear or branched (saturated and/or unsaturated) fatty acid, a polyoxyethylene (POE)/polyoxypropylene (POP) copolymer (a random copolymer or a block copolymer), an alkylene oxide adduct of acetylene glycol. Among them, preferable is a surfactant wherein structure of an alkylene oxide addition portion and a polyalkylene glycol portion is polyoxyethylene (POE), polyoxypropylene (POP) or a POE/POP copolymer (which may be a random copolymer or may be a block copolymer).

Preferably, the nonionic surfactant has the structure free from an aromatic group from a viewpoint of environmental problems (for example, biodegradability and endocrine disruptors).

The nonionic surfactant may be a surfactant of the formula:

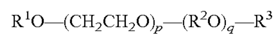

$$R^1O\text{—}(CH_2CH_2O)_p\text{—}(R^2O)_q\text{—}R^3$$

wherein $R^1$ is an alkyl group having 1 to 22 carbon atoms or an alkenyl or acyl group having 2 to 22 carbon atoms, $R^2$ is an alkylene group having at least 3 (for example, 3 to 10) carbon atoms, $R^3$ is a hydrogen atom, an alkyl group having 1 to 22 carbon atoms or an alkenyl group having 2 to 22 carbon atoms, p is the number of at least 2, and q is 0 or the number of at least 1.

$R^1$ is preferably has 8 to 20 carbon atoms, especially 10-18 carbon atoms. Preferable examples of $R^1$ include a lauryl group, a tridecyl group and an oleyl group.

Examples of $R^2$ are a propylene group and a butylene group.

In the nonionic surfactant, p may be the number of at least 3 (for example, 5 to 200). q may be the number of at least 2 (for example, 5 to 200). That is, $—(R^2O)_q—$ may form the polyoxyalkylene chain.

The nonionic surfactant is a polyoxyethylenealkylene alkyl ether having a hydrophilic polyoxyethylene chain in the molecular center and hydrophobic oxyalkylene chains (particularly, polyoxyalkylene chains). Examples of the hydrophobic oxyalkylene chain include an oxypropylene chain, an oxybutylene chain and a styrene chain. Among them, the oxypropylene chain is preferable.

A preferable nonionic surfactant is the formula:

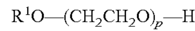

$$R^1O—(CH_2CH_2O)_p—H$$

wherein $R^1$ and p are the same as the above.

Examples of the nonionic surfactant include the followings:

$$C_{10}H_{21}O—(CH_2CH_2O)_p—(C_3H_6O)_q—H$$

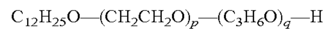

$$C_{12}H_{25}O—(CH_2CH_2O)_p—(C_3H_6O)_q—H$$

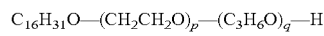

$$C_{16}H_{31}O—(CH_2CH_2O)_p—(C_3H_6O)_q—H$$

$$C_{16}H_{33}O—(CH_2CH_2O)_p—(C_3H_6O)_q—H$$

$$C_{18}H_{35}O—(CH_2CH_2O)_p—(C_3H_6O)_q—H$$

$$C_{18}H_{37}O—(CH_2CH_2O)_p—(C_3H_6O)_q—H$$

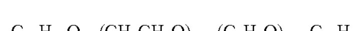

$$C_{12}H_{25}O—(CH_2CH_2O)_p—(C_3H_6O)_q—C_{12}H_{25}$$

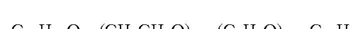

$$C_{16}H_{31}O—(CH_2CH_2O)_p—(C_3H_6O)_q—C_{16}H_{31}$$

$$C_{16}H_{33}O—(CH_2CH_2O)_p—(C_3H_6O)_q—C_{12}H_{25}$$

$$\text{iso-}C_{13}H_{27}O—(CH_2CH_2O)_p—(C_3H_6O)_q—H$$

$$C_{10}H_{21}COO—(CH_2CH_2O)_p—(C_3H_6O)_q—H$$

$$C_{16}H_{33}COO—(CH_2CH_2O)_p—(C_3H_6O)_q—C_{12}H_{25}$$

wherein p and q are the same as defined in the above.

Examples of the nonionic surfactant include a condensation product of ethylene oxide with, for example, hexyl phenol, isooctyl phenol, hexadecanol, oleic acid, alkane ($C_{12}$-$C_{16}$) thiol, a sorbitan mono-fatty acid ($C_7$-$C_{19}$) or an alkyl ($C_{12}$-$C_{18}$) amine.

The amount of the polyoxyethylene block may be 5 to 80% by weight, for example, 30 to 75% by weight, especially 40 to 70% by weight, based on the molecular weight of the nonionic surfactant (copolymer).

Generally, the average molecular weight of the nonionic surfactant is from 300 to 5,000, for example, from 500 to 3,000.

The nonionic surfactant can be used alone or in combination of at least two.

Preferably, the nonionic surfactant is in combination of at least two. In the combination of at least two, at least one nonionic surfactant may be a compound represented by $R^1O—(CH_2CH_2O)_p—(R^2O)_q—R^3$ [especially, $R^1O—(CH_2CH_2O)_p—H$] wherein the $R^1$ group (and/or, the $R^3$ group) is a branched alkyl group (for example, an isotridecyl group). The amount of the nonionic surfactant wherein the $R^1$ group is the branched alkyl group may be 5 to 100 parts by weight, for example, 8 to 50 parts by weight, especially 10 to 40 parts by weight, based on the total of 100 parts by weight of the nonionic surfactant (B2). In the combination of at least two, the remaining nonionic surfactant may be a compound represented by $R^1—(CH_2CH_2O)_p—(R^2O)_q—R^3$ [especially, $R^1O—(CH_2CH_2O)_p—H$] wherein the $R^1$ group (and/or, the R3 group) is a (saturated and/or unsaturated) linear alkyl group (for example, a lauryl group (a n-lauryl group)).

(B3) Cationic Surfactant

Preferably, the cationic surfactant is a compound which does not have an amide group.

Preferably, the cationic surfactant is an ammonium salt. The cationic surfactant may be an ammonium salt of the formula:

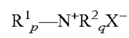

$$R^1_p—N^+R^2_qX^-$$

wherein $R^1$ is a linear and/or branched aliphatic (saturated and/or unsaturated) group having at least 12 carbon atoms (for example, $C_{12}$-$C_{50}$), $R^2$ is H, an alkyl group having 1 to 4 carbon atoms, a benzyl group, or a polyoxyethylene group (the number of the oxyethylene groups is, for example, at least 1 (particularly at least 2, specially at least 3) and up to 50) ($CH_3$ and $C_2H_5$ are especially preferable), X is a halogen atom or a $C_1$-$C_4$ fatty-acid-salt group, p is 1 or 2, q is 2 or 3, and p+q=4.

The carbon number of $R^1$ may be from 12 to 50, for example, from 12 to 30.

Specific examples of the cationic surfactant include dodecyl trimethyl ammonium acetate, trimethyl tetradecyl ammonium chloride, hexadecyl trimethyl ammonium bromide, trimethyl octadecyl ammonium chloride, (dodecylmethylbenzyl)trimethyl ammonium chloride, benzyl dodecyl dimethyl ammonium chloride, methyl dodecyl di(hydropolyoxyethylene)ammonium chloride, benzyl dodecyl di(hydropolyoxyethylene)ammonium chloride and N-[2-(diethylamino)ethyl]oleamide hydrochloride.

The composition of the present invention may contain a defoaming agent depending on the necessity. Particularly when the increase of foam caused by the containment of the surfactant will be apprehended, it is necessary to use the defoaming agent. The defoaming agent include various types for aqueous system and examples of the defoaming agent include lower alcohols such as methanol, ethanol and butanol; higher alcohols such as amyl alcohol, polypropylene glycol and derivatives thereof; oils and fats such as oleic acid, tall oil, mineral oil and soap; surfactants such as sorbitan fatty acid ester, polyethylene glycol fatty acid ester and Pluronic nonionic surfactant; silicone surfactants such as siloxane and silicone resin. These are used alone or in combination. Representatives of commercially available defoaming agents are B-series such as ADEKANATE B and ADEKANATE B 1068 (available from Asahi Denka Co., Ltd.); FOAMASTER DL, NOPCO NXZ, DEFOAMER series such as SN DEFOAMER 113, 325, 308 and 368; DEHYDRAN 1293, DEHYDRAN 1513 (available from San Nopco Ltd.); FLOWNON SB-110N, SB-210, 510, 551, AQUALEN 800, 805, AQUALEN 1488 (available from Kyoeisya Chemical Co., Ltd.); SURFYNOL 104E (acetylene-based defoaming agent available from Air Products and Chemicals, Inc.); KS-607A (available from Shin-Etsu Chemical Co., Ltd.); FS ANTIFOAM (available from Dow Corning Inc.); BYK-020, 031, 073, W (available from BYK Chemie); DEHYDRAN 981(available from Henkel Japan Co., Ltd.); EPAN-410, 710, 720 (available from Dai-ichi Kogyo Seiyaku Co., Ltd.); TEGO FORMEX Series (available from Tego Goldschmidt); and FOAMLEX-747, TY-10, EP series (available from Nicca Chemical Co., Ltd.). The amount of the defoaming agent is preferably from 0.01 to 10% by weigh, more preferably from 0.05 to 5% by weight, based on the aqueous emulsion.

The aqueous medium (C) is water alone, or a mixture of water and an organic solvent (the weight ratio of water and the organic solvent is 99.99:0.01-70:30). The organic solvent (that is, a water-soluble organic solvent) can improve the dispersibility of the polymer. Examples of the organic solvent are ketones such as acetone and methyl ethyl ketone; ethylene glycol derivatives such as ethylene glycol and polyethylene glycol; alkyl ethers of ethylene glycol derivatives such as polyethylene glycol monomethyl ether, polyethylene glycol dimethyl ether and polyethylene glycol monobutyl ether; propylene glycol derivatives such as propylene glycol, dipropylene glycol, tripropylene glycol and polypropylene glycol; polyethers such cyclodextrin and dextrin; esters such as methyl acetate and ethyl acetate; and N-alkyl pyrrolidone. The amount of the organic solvent may be from 5 to 200 parts by weight, for example, from 10 to 100 parts by weight, particularly from 20 to 80 parts by weight, based on 100 parts by weight of the polymer.

If necessary, the aqueous dispersion may contain additives such as a crosslinking agent, another polymer, another water-repellent agent and/or oil-repellent agent, a mothproofing agent, a flame retardant, an antistatic agent, a dye stabilizing agent, and anti-crease agent.

The crosslinking agent includes a blocked isocyanate compound, a melamine resin compound, a glyoxal resin compound, a urea resin compound, a polymer comprising a crosslinkable monomer (for example, N-methylol acrylamide, and a blocked material of 2-isocyanatoethyl methacrylate) as an essential polymerization unit. The blocked isocyanate compound and the melamine resin compound are preferable. The blocked isocyanate compound is preferably a compound which is free of a polymerizable unsaturated group, and which has the structure wherein an isocyanate group of the polyisocyanate is blocked with a blocking agent. The melamine resin compound includes trimethylol melamine and hexamethylol melamine.

The aqueous dispersion of the present invention can be prepared by emulsion-polymerizing the polymerizable compound in water optionally containing the organic solvent in the presence of a polymerization initiator and the surfactant to give the polymer emulsion. In the surfactant, the amidoamine surfactant (B1) is essential. The surfactant optionally contains another surfactant, for example, the nonionic surfactant (B2) and the cationic surfactant (B3). The amidoamine surfactant (B1) may be included at the time of the emulsion polymerization, or may be added after the polymerization.

The used amount of the surfactant may be as follows:

Amidoamine surfactant (B1): 0.1 to 20 parts by weight, preferably 0.2 to 10 parts by weight, for example, 0.3 to 5 parts by weight, Nonionic surfactant (B2): 0 to 20 parts by weight, preferably 0.1 to 10 parts by weight, for example, 1 to 8 parts by weight, and Cationic surfactant (B3): 0 to 20 parts by weight, 0.1 to 10 parts by weight, preferably 0.1 to 5 parts by weight, based on 100 parts by weight of the polymer.

Preferably, the amount of an amidoamine surfactant (B1) is from 5 to 100% by weight, for example, 5 to 50% by weight, especially 10 to 50% by weight, based on the total of the surfactant.

In an emulsion polymerization, there can be used a method of emulsifying monomers in water in the presence of a polymerization initiator and an emulsifying agent, replacing the atmosphere by nitrogen, and polymerizing with stirring, for example, at the temperature within the range from 50° C. to 80° C. for 1 hour to 10 hours. As the polymerization initiator, for example, water-soluble initiators (e.g., benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate and ammonium persulfate) and oil-soluble initiators (e.g., azobisisobutyronitrile, benzoyl peroxide, di-tert-butyl peroxide, lauryl peroxide, cumene hydroperoxide, t-butyl peroxypivalate and diisopropyl peroxydicarbonate) are used.

In order to obtain a polymer dispersion in water, which is superior in storage stability, it is preferable that the monomers are dispersed in water by using an emulsifying device capable of applying a strong shearing energy (e.g., a high-pressure homogenizer and an ultrasonic homogenizer) and then polymerized with using the polymerization initiator. When the monomers are not completely compatibilized, a compatibilizing agent (e.g., a water-soluble organic solvent and a low-molecular weight monomer) capable of sufficiently compatibilizing them is preferably added to these monomers. By the addition of the compatibilizing agent, the emulsifiability and polymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in the amount within the range from 1 to 50 parts by weigh e.g., from 10 to 40 parts by weight, based on 100 parts by weight of water. Examples of the low-molecular weight monomer include methyl methacrylate, glycidyl methacrylate and 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers.

The concentration of the fluorine-containing polymer in the aqueous emulsion composition may be, for example, from 0.01 to 50% by weight.

A substrate to which the aqueous dispersion is applied is a textile or a solid sheet. Preferably, the substrate is a sheet-shaped article, for example, a cloth. The textile includes a fiber as such, a yarn made from the fiber, a fabric made from the fiber. The solid sheet is a sheet free of voids, unlike the fabric made of fiber.

The substrate may be a film, a fiber, a yam, a woven fabric, a carpet, or a sheet made from a filament, fiber or yarn prepared from a natural polymer material, a modified natural polymer material or a synthesized polymer material.

The dispersion according to the present invention can be applied to the substrate preferably by coating, dipping, spraying, padding, roll coating, or combination of these procedures. For example, a padding bath having the bath solid content of 0.1 to 10% by weight can be used. The substrate is padded in the padding bath, and then excess liquid is usually removed by a squeezing roll to give the dry pickup amount (the weight of dry polymer on the substrate) of from 0.01 to 10% by weight based on the weight of the substrate. Then, the treated substrate is preferably heated at 100-200° C. depending on the necessity.

In the present invention, the substrate is treated by the treatment agent (the dispersion). The "treatment" means that a treatment agent is applied to a substrate by immersion, spraying, coating or the like. The fluorine-containing polymer which is an active component of the treatment agent can penetrate the internal of the substrate or can adhere on the surface of the substrate by the treatment.

EXAMPLES

The following Examples and Comparative Examples are shown to specifically illustrate the present invention.

The properties were measured as follows:

Water- and Oil-repellency

A polymer dispersion is diluted with water to give a treatment liquid having a solid concentration of 1% by weight. After immersing a polyester fabric in the treatment liquid, squeezing the fabric at 4 kg/cm$^2$ and 4 m/min with a mangle and heat-treating the fabric for 1 minute at 170° C., the water- and oil-repellency of the treated fabric is evaluated (HL0). According to the JISL-0217-103 method, a washing durability is tested by performing tumbler dryness after 10 times wash with a laundering fluid at 40° C., to evaluate water- and oil-repellency (HL10).

The water repellency is represented by the water-repellency numbers shown in the following Table 1 determined by a spray method of JIS L-1092.

TABLE 1

| Water repellency No. | State |
|---|---|
| 5 | No wet or water droplets adhesion on surface |
| 4 | No wet but small water droplets adhesion on surface |
| 3 | Separate small water droplets-like wet on surface |
| 2 | Wet on half of surface and separate small wet which penetrates fabric |
| 1 | Wet on whole surface |

According to AATCC™ 118, the oil repellency is determined by dropping three droplets of the test liquid shown in the following Table 2 on the fabric and observing a penetration state after 30 seconds. The oil repellency is expressed by a maximum point of the test liquid which does not penetrate.

TABLE 2

| Oil-repellency test liquid | | |
|---|---|---|
| Point | Test liquid | Surface tension (dyne/cm, 25° C.) |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture liquid of n-Hexadecane 35/nujol 65 | 29.6 |
| 1 | Nujol | 31.2 |
| 0 | Inferior to 1 | — |

Gum-up Property

The polymer dispersion was diluted with tap water to give a solid concentration of 1.8 wt %, and a treatment liquid is charged into a pad which can be adjusted to a temperature of 40° C. In the manner that a continuous treatment can be carried out with a mangle roll wherein a cotton fabric having 20 cm in width and 80 cm in length is made into a ring, the continuous treatment is performed with a mangle pressure of 0.55 MPa. The adhesion state of polymer to mangle is visually observed after 1 hour, and the gum-up property is evaluated by using standards of the following Table 3.

TABLE 3

| Gum-up property | |
|---|---|
| Point | State |
| 5 | Almost no adhesion to roll |
| 4 | Slight adhesion of fine and coarse substances to roll, which are easily removed |
| 3 | Adhesion of slightly sticky and massive substances to roll, which are easily removed |
| 2 | Adhesion of sticky and massive substances to roll, which are hardly removed |
| 1 | Much adhesion of sticky and massive substances to roll, which are hardly removed |

Mechanical Stability

The polymer composition is diluted with tap water to a solid concentration of 0.9% by weight and stirred with a homomixer at 2,500 rpm for 5 minutes with controlling a temperature at 40° C. The generated scum is filtered off with a black cotton fabric. A treatment liquid, wherein 60 ppm of a dye adhesive agent is added, is also tested. A scum generation is evaluated by standards of the following Table 4. The absence of scum is preferable.

TABLE 4

| Scum generation | |
|---|---|
| Point | State |
| Good | Almost no scum generated |
| Fair | Slight scum generated |
| Poor | Much scum generated |

Example 1

Into a 1 L autoclave, $C_8F_{17}CH_2CH_2OCOCH{=}CH_2$ (140 g), stearyl acrylate (18 g), N-methylol acrylamide (4.5 g), 3-chloro-2-hydroxypropyl methacrylate (1.1 g), tripropylene glycol (62.5 g), pure water (380 g), dimethylaminopropyl oleamide (1.8 g), polyoxyethylene lauryl ether (14.2 g), polyoxyethylene oleyl ether (3.5 g) and polyoxyethylene isotridecyl ether (6.1 g) were charged, and then dispersed for emulsification by a supersonic wave after warmed at 60° C. After the emulsification, lauryl mercaptan (1.1 g) was added and vinyl chloride (45 g) was injected. Further, 2,2-azobis-(2-amidinopropane)dihydrochloride (1.4 was added and a reaction was conducted at 60° C. for 3 hours to obtain an aqueous dispersion of a polymer. Properties of the aqueous dispersion, the concentration of which was adjusted with pure water to have a solid content of 30% by weight, were measured.

Example 2

Into a 1 L autoclave, $C_6F_{13}CH_2CH_2OCOC(CH_3){=}CH_2$ (133 g), stearyl acrylate (10 g), isobornyl methacrylate (20 g), diacetone acrylamide (4.1 g), tripropylene glycol (55 g), pure water (370 g), dimethylaminopropyl oleamide (1.6 g), polyoxyethylene lauryl ether (3.4 g), polyoxyethylene oleyl ether (7 g) and polyoxyethylene isotridecyl ether (4.2 g) were charged, and then dispersed for emulsification by a supersonic wave after warmed at 60° C. After the emulsification, lauryl mercaptan (0.4 g) was added and vinyl chloride (35 g) was injected. Further, 2,2-azobis-(2-amidinopropane)dihydrochloride (2.9 g) was added and a reaction was conducted at 60° C. for 3 hours to obtain an aqueous dispersion of a polymer. Properties of the aqueous dispersion, the concentration of which was adjusted with pure water to have a solid content of 30% by weight, were measured.

Example 3

Into a 1 L autoclave, $C_6F_{13}CH_2CH_2OCOC(CH_3){=}CH_2$ (133 g), stearyl acrylate (10 g), isobornyl methacrylate (20 g), diacetone acrylamide (4.1 g), tripropylene glycol (55 g), pure water (370 g), dimethylaminopropyl oleamide (6.5 g), polyoxyethylene lauryl ether (3.4 g), polyoxyethylene oleyl ether (7 g) and polyoxyethylene isotridecyl ether (4.2 g) were charged, and then dispersed for emulsification by a supersonic wave after warmed at 60° C. After the emulsification, lauryl mercaptan (0.4 g) was added and vinyl chloride (35 g) was injected. Further, 2,2-azobis-(2-amidinopropane)dihydrochloride (2.9 g) was added and a reaction was conducted at 60° C. for 3 hours to obtain an aqueous dispersion of a polymer. Properties of the aqueous dispersion, the concentration of which was adjusted with pure water to have a solid content of 30% by weight, were measured.

Example 4

Into a 1 L autoclave, $C_6F_{13}CH_2CH_2OCOCCl{=}CH_2$ (133 g), stearyl acrylate (10 g), diacetone acrylamide (4.1 g), tripropylene glycol (55 g), pure water (370 g), dimethylaminopropyl oleamide (1.6 g), polyoxyethylene lauryl ether (3.4 g), polyoxyethylene oleyl ether (7 g) and polyoxyethylene isotridecyl ether (4.2 g) were charged, and then dispersed for emulsification by a supersonic wave after warmed at 60° C. After the emulsification, lauryl mercaptan (0.4 g) was added and vinyl chloride (35 g) was injected. Further, 2,2-azobis-(2-amidinopropane)dihydrochloride (2.9 g) was added and a reaction was conducted at 60° C. for 3 hours to obtain an aqueous dispersion of a polymer. Properties of the aqueous dispersion, the concentration of which was adjusted with pure water to have a solid content of 30% by weight, were measured.

Example 5

Into a 1 L autoclave, $C_6F_{13}CH_2CH_2OCOC(CH_3){=}CH_2$ (133 g), stearyl acrylate (10 g), diacetone acrylamide (4.1 g), tripropylene glycol (55 g), pure water (370 g), dimethylaminopropyl stearamide (1.6 g), polyoxyethylene lauryl ether (3.4 g), polyoxyethylene oleyl ether (7 g) and polyoxyethylene isotridecyl ether (4.2 g) were charged, and then dispersed for emulsification by a supersonic wave after warmed at 60° C. After the emulsification, lauryl mercaptan (0.4 g) was added and vinyl chloride (35 g) was injected. Further, 2,2-azobis-(2-amidinopropane)dihydrochloride (2.9 g) was added and a reaction was conducted at 60° C. for 3 hours to obtain an aqueous dispersion of a polymer. Properties of the aqueous dispersion, the concentration of which was adjusted with pure water to have a solid content of 30% by weight, were measured.

Comparative Example 1

Into a 1 L autoclave, $C_8F_{17}CH_2CH_2OCOCH{=}CH_2$ (140 g), stearyl acrylate (18 g), N-methylol acrylamide (4.5 g), 3-chloro-2-hydroxypropyl methacrylate (1.1 g), tripropylene glycol (62.5 g), pure water (380 g), polyoxyethylene lauryl ether (14.2 g), polyoxyethylene oleyl ether (3.5 g) and polyoxyethylene isotridecyl ether (6.1 g) were charged, and then dispersed for emulsification by a supersonic wave after warmed at 60° C. After the emulsification, lauryl mercaptan (1.1 g) was added and vinyl chloride (45 g) was injected. Further, 2,2-azobis-(2-amidinopropane)dihydrochloride (1.4 g) was added and a reaction was conducted at 60° C. for 3 hours to obtain an aqueous dispersion of a polymer. Properties of the aqueous dispersion, the concentration of which was adjusted with pure water to have a solid content of 30% by weight, were measured.

Comparative Example 2

Into a 1 L autoclave, $C_6F_{13}CH_2CH_2OCOC(CH_3){=}CH_2$ (133 g), stearyl acrylate (10 g), isobornyl methacrylate (20 g), diacetone acrylamide (4.1 g), tripropylene glycol (55 g), pure water (370 g), polyoxyethylene lauryl ether (3.4 g), polyoxyethylene oleyl ether (7 g) and polyoxyethylene isotridecyl ether (4.2 g) were charged, and then dispersed for emulsification by a supersonic wave after warmed at 60° C. After the emulsification, lauryl mercaptan (0.4 g) was added and vinyl chloride (35 g) was injected. Further, 2,2-azobis-(2-amidinopropane)dihydrochloride (2.9 g) was added and a reaction was conducted at 60° C. for 3 hours to obtain an aqueous dispersion of a polymer. Properties of the aqueous dispersion, the concentration of which was adjusted with pure water to have a solid content of 30% by weight, were measured.

Comparative Example 3

Into a 1 L autoclave, $C_6F_{13}CH_2CH_2OCOCCl{=}CH_2$ (133 g), stearyl acrylate (10 g), diacetone acrylamide (4.1 g), tripropylene glycol (55 g), pure water (370 g), polyoxyethylene lauryl ether (3.4 g), polyoxyethylene oleyl ether (7 g) and polyoxyethylene isotridecyl ether (4.2 g) were charged, and then dispersed for emulsification by a supersonic wave after warmed at 60° C. After the emulsification, lauryl mercaptan (0.4 g) was added and vinyl chloride (35 g) was injected. Further, 2,2-azobis-(2-amidinopropane)dihydrochloride (2.9 g) was added and a reaction was conducted at 60° C. for 3 hours to obtain an aqueous dispersion of a polymer. Properties of the aqueous dispersion, the concentration of which was adjusted with pure water to have a solid content of 30% by weight, were measured.

Comparative Example 4

Into a 1 L autoclave, $C_6F_{13}CH_2CH_2OCOC(CH_3){=}CH_2$ (133 g), stearyl acrylate (10 g), isobornyl methacrylate (20 g), diacetone acrylamide (4.1 g), tripropylene glycol (55 g), pure water (370 polyoxyethylene sorbitan monostearate (1.6 g), polyoxyethylene lauryl ether (3.4 g), polyoxyethylene oleyl ether (7 g) and polyoxyethylene isotridecyl ether (4.2 g) were charged, and then dispersed for emulsification by a supersonic wave after warmed at 60° C. After the emulsification, lauryl mercaptan (0.4 g) was added and vinyl chloride (35 g) was injected. Further, 2,2-azobis-(2-amidinopropane)dihydrochloride (2.9 g) was added and a reaction was conducted at 60° C. for 3 hours to obtain an aqueous dispersion of a polymer. Properties of the aqueous dispersion, the concentration of which was adjusted with pure water to have a solid content of 30% by weight, were measured.

Comparative Example 5

Into a 1 L autoclave, $C_6F_{13}CH_2CH_2OCOC(CH_3){=}CH_2$ (133 g), stearyl acrylate (10 g), isobornyl methacrylate (20 g), diacetone acrylamide (4.1 g), tripropylene glycol (55 g), pure water (370 g), polyoxyethyleneglycol monolaurate (1.6 g), polyoxyethylene lauryl ether (3.4 g), polyoxyethylene oleyl ether (7 g) and polyoxyethylene isotridecyl ether (4.2 g) were charged, and then dispersed for emulsification by a supersonic wave after warmed at 60° C. After the emulsification, lauryl mercaptan (0.4 g) was added and vinyl chloride (35 g) was injected. Further, 2,2-azobis-(2-amidinopropane)dihydrochloride (2.9 g) was added and a reaction was conducted at 60° C. for 3 hours to obtain an aqueous dispersion of a polymer. Properties of the aqueous dispersion, the concentration of which was adjusted with pure water to have a solid content of 30% by weight, were measured.

Comparative Example 6

Into a 1 L autoclave, $C_6F_{13}CH_2CH_2OCOC(CH_3){=}CH_2$ (133 g), stearyl acrylate (10 g), isobornyl methacrylate (20 g), diacetone acrylamide (4.1 g), tripropylene glycol (55 g), pure water (370 g), dimethyllaurylamine oxide (1.6 g), polyoxyethylene lauryl ether (3.4 g), polyoxyethylene oleyl ether (7 g) and polyoxyethylene isotridecyl ether (4.2 g) were charged, and then dispersed for emulsification by a supersonic wave after warmed at 60° C. After the emulsification, lauryl mercaptan (0.4 g) was added and vinyl chloride (35 g) was injected. Further, 2,2-azobis-(2-amidinopropane)dihydrochloride (2.9 g) was added and a reaction was conducted at 60° C. for 3 hours to obtain an aqueous dispersion of a polymer. Properties of the aqueous dispersion, the concentration of which was adjusted with pure water to have a solid content of 30% by weight, were measured.

Comparative Example 7

Into a 1 L autoclave, $C_6F_{13}CH_2CH_2OCOC(CH_3){=}CH_2$ (133 g), stearyl acrylate (10 g), isobornyl methacrylate (20 g), diacetone acrylamide (4.1 g), tripropylene glycol (55 g), pure water (370 g), dimethylaminopropyl oleamide (1.6 g), a polyethylene oxide adduct of 2,4,7,9-tetramethyl-5-decyne-4,7-diol (an alkylene oxide adduct of diol having an unsaturated triple bond) (1.0 g), polyoxyethylene lauryl ether (3.4 g), polyoxyethylene oleyl ether (7 g) and polyoxyethylene isotridecyl ether (4.2 g) were charged, and then dispersed for emulsification by a supersonic wave after warmed at 60° C. After the emulsification, lauryl mercaptan (0.4 g) was added and vinyl chloride (35 g) was injected. Further, 2,2-azobis-(2-amidinopropane)dihydrochioride (2.9 g) was added and a reaction was conducted at 60° C. for 3 hours to obtain an aqueous dispersion of a polymer. Properties of the aqueous dispersion, the concentration of which was adjusted with pure water to have a solid content of 30% by weight, were measured.

Properties in each of Examples are shown in Table 5.

TABLE 5

| | Water repellency | | Oil repellency | | Gum- | Mechanical stability | |
|---|---|---|---|---|---|---|---|
| | | | | | | Without dye adhesive | With dye adhesive |
| | HL0 | HL10 | HL0 | HL10 | up | agent | agent |
| Ex. 1 | 5 | 5 | 7 | 6 | 5 | Good | Good |
| Ex. 2 | 5 | 5 | 6 | 5 | 4 | Good | Good |
| Ex. 3 | 5 | 5 | 6 | 5 | 5 | Good | Good |
| Ex. 4 | 5 | 5 | 6 | 5 | 4 | Good | Good |
| Ex. 5 | 5 | 5 | 6 | 5 | 4 | Good | Good - Fair |
| Com. Ex. 1 | 5 | 5 | 7 | 6 | 2 | Fair | Bad |
| Com. Ex. 2 | 5 | 5 | 6 | 5 | 2 | Fair | Bad |
| Com. Ex. 3 | 5 | 5 | 6 | 5 | 2 | Fair | Bad |
| Com. Ex. 4 | 5 | 5 | 6 | 5 | 2 | Bad | Bad |
| Com. Ex. 5 | 5 | 5 | 6 | 5 | 1 | Bad | Bad |
| Com. Ex. 6 | 5 | 5 | 6 | 5 | 2 | Fair | Bad |
| Com. Ex. 7 | 5 | 5 | 6 | 5 | 4 | Good - Fair | Good - Fair |

INDUSTRIAL AVAILABILITY

The aqueous emulsion composition of the present invention can be used as a surface treatment agent, for example, a water- and oil-repellent agent, and a soil-resistant agent.

The invention claimed is:

1. An aqueous emulsion composition comprising:

(A) a polymer having a fluoroalkyl group, and (B) a surfactant comprising:

(B1) an amidoamine surfactant having an amide group and an amino group, and (B2) a nonionic surfactant, wherein the polymer having a fluoroalkyl group (A) comprises repeating units derived from a fluorine-containing monomer of the formula:

$$CH_2{=}C(—X)—C({=}O)—Y—Z—Rf$$

wherein X is a hydrogen atom, a monovalent organic group or a halogen atom,

Y is —O— or —NH—,

Z is a direct bond or a divalent organic group, and

Rf is a fluoroalkyl group having 1 to 20 carbon atoms, the amidoamine surfactant (B1) is a compound of the formula:

$$R^1—CONH—(CH_2)_n—N(R^2)(R^3)$$

wherein $R^1$ is an alkyl group or alkenyl group having 8-30 carbon atoms, $R^2$ and $R^3$ are an alkyl group having 1-6 carbon atoms, and n is 1 to 10, the nonionic surfactant (B2) is a surfactant of the formula:

$$R^1O—(CH_2CH_2O)_p—H$$

wherein $R^1$ is an alkyl group having 1 to 22 carbon atoms or an alkenyl or acyl group having 2 to 22 carbon atoms, and p is the number of at least 2, and the surfactant (B) does not contain an alkylene oxide adduct of a monool or polyol having an unsaturated triple bond, and the amount of the amidoamine surfactant (B1) is 0.1 to 20 parts by weight and the amount of the nonionic surfactant (B2) is 0.1 to 20 parts by weight, based on 100 parts by weight of the polymer (A).

2. The composition according to claim 1, wherein the polymer having a fluoroalkyl group (A) has a perfluoroalkyl group having 6 carbon atoms.

3. The composition according to claim 1, wherein, in at least one nonionic surfactant (B2), the $R^1$ group is a branched alkyl group.

4. The composition according to claim 1, wherein the composition is a water- and oil-repellent agent, and/or a soil-resistant agent.

5. The composition according to claim 1, wherein the fluorine-containing monomer is an acrylate ester of the formula:

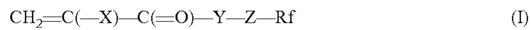

$$CH_2{=}C({-}X){-}C({=}O){-}Y{-}Z{-}Rf \quad (I)$$

wherein X is a hydrogen atom, a linear or branched alkyl group having 1 to 21 carbon atoms, a fluorine atom, a chlorine atom, a bromine atom, a iodine atom, a $CFX^1X^2$ group wherein $X^1$ and $X^2$ is a hydrogen atom, a fluorine atom, a chlorine atom, a bromine atom or a iodine atom; a cyano group, a linear or branched fluoroalkyl group having 1 to 21 carbon atoms, a substituted or unsubstituted benzyl group, or a substituted or unsubstituted phenyl group;

Y is —O—or —NH—;

Z is an aliphatic group having 1 to 10 carbon atoms, an aromatic or cycloaliphatic group having 6 to 18 carbon atoms, a $—CH_2CH_2N(R^1)SO_2—$ group wherein $R^1$ is an alkyl group having 1 to 4carbon atoms, a $—CH_2CH(OZ^1)\ CH_2\text{-}(Ph\text{-}O)_p—$ group wherein $Z^1$ is a hydrogen atom or an acetyl group, Ph is a phenylene group and p is 0 or 1, a $—(CH_2)_n\text{-}Ph\text{-}O—$group wherein Ph is a phenylene group and n is 0 to 10, a $—(CH_2)_m—SO_2—(CH_2)_n\text{-}$ group, or a $—(CH_2)_m—S—(CH_2)_n—$ group wherein m is from 1 to 10 and n is from 0 to 10; and Rf is a linear or branched fluoroalkyl group having 1 to 20 carbon atoms.

6. The composition according to claim 1, wherein the polymer having a fluoroalkyl group (A) further comprises repeating units derived from a fluorine-free non-crosslinkable monomer, and the fluorine-free non-crosslinkable monomer is acrylates of the general formula:

$$CH_2{=}CA^1COOA^2$$

wherein $A^1$ is a hydrogen atom, a methyl group, or a halogen atom other than a fluorine atom, and $A^2$ is an alkyl group represented by $C_nH_{2n+1}$ (n=1-30).

7. The composition according to claim 6, wherein the amount of the fluorine-free non-crosslinkable monomer is 0.1 to 300 parts by weight, based on 100 parts by weight of the fluorine-containing monomer.

8. The composition according to claim 1, wherein, in the amidoamine surfactant (B1), $R^1$ is the alkyl group or alkenyl group having 12-24 carbon atoms, $R^2$ and $R^3$ are the alkyl groups having 1-4carbon atoms, and n is 2 to 5.

9. The composition according to claim 1, wherein the amount of the amidoamine surfactant (B1) is from 5 to 50% by weight, based on the total of the surfactant.

10. The composition according to claim 1, wherein the amount of the nonionic surfactant (B2) is 0.1 to 10 parts by weight, based on 100 parts by weight of the polymer (A).

11. The composition according to claim 1, wherein the aqueous emulsion composition further comprises:

(C) an aqueous medium, and the concentration of the polymer (A) in the aqueous emulsion composition is from 0.01 to 50% by weight.

12. The composition according to claim 1, wherein the amidoamine surfactant (B1) is nonionic.

13. A method of treating a substrate which comprises applying to the substrate the aqueous emulsion composition according to claim 1.

14. A treated substrate obtained by the treatment method according to claim 13.

* * * * *